United States Patent [19]

Hewitt

[11] 4,420,035

[45] Dec. 13, 1983

[54] THERMAL CONTROL SYSTEM

[75] Inventor: Dennis R. Hewitt, Laurel, Md.

[73] Assignee: The United States of America as represented by the Administrator of the National Aeronautics and Space Administration, Washington, D.C.

[21] Appl. No.: 434,672

[22] Filed: Oct. 15, 1982

[51] Int. Cl.³ .............................................. F28F 13/00
[52] U.S. Cl. ........................................ 165/32; 165/41; 165/96
[58] Field of Search ...................... 165/32, 41, 104.26, 165/96

[56] References Cited

U.S. PATENT DOCUMENTS

| | | | |
|---|---|---|---|
| 3,450,195 | 6/1969 | Schnacke | 165/104.26 X |
| 3,517,730 | 6/1970 | Wyatt | 165/104.26 X |
| 3,525,386 | 8/1970 | Grover | 165/104.26 X |
| 4,162,701 | 7/1979 | Ollendorf | 165/32 |

Primary Examiner—Albert W. Davis, Jr.
Attorney, Agent, or Firm—Robert E. Bushnell; John R. Manning; John O. Tresansky

[57] ABSTRACT

A variable, thermal control system (10) for regulating the temperature of an exothermic process plant carried aboard an earth orbiting spacecraft is made with a plurality of curved radiator panels (14) arcuately positioned in a circular arrangement to form an open receptacle. A module (12) containing the process is insertable into the receptacle. Heat exchangers (42) having broad exterior surfaces (43) extending axially above the circumference of the module (12) fit within arcuate spacings (18) between adjacent radiator panels (14). Banks of variable conductance heat pipes (24) partially embedded within and thermally coupled to the radiator panels (14) extend across the arcuate spacings (18) and are thermally coupled to broad exterior surfaces (43) of the heat exchangers by flanges (26). Temperature sensors (86) monitor the temperature of process fluid flowing from the module through the heat exchanges. Thermal conduction between the heat exchangers (42) and the radiator panels is regulated by heating a control fluid within the heat pipes to vary the effective thermal length of the heat pipes (24) in inverse proportion to changes in the temperature of the process fluid.

6 Claims, 9 Drawing Figures

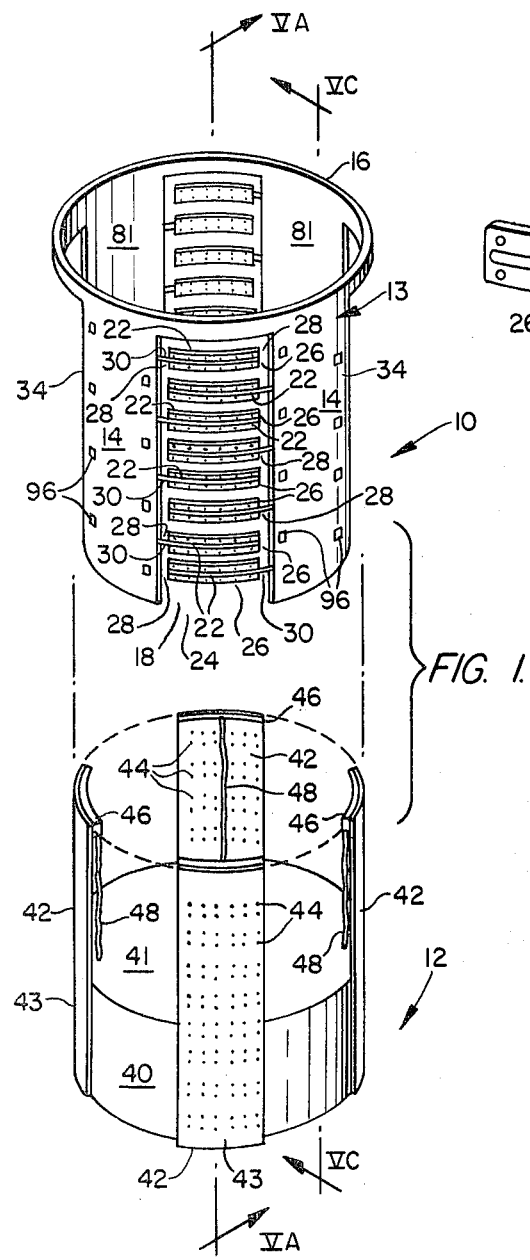
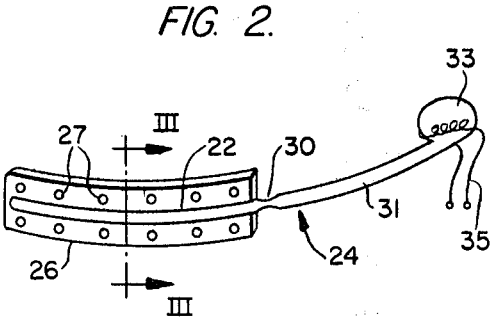
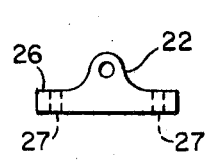

THERMAL CONTROL SYSTEM

ORIGIN OF THE INVENTION

The invention described herein was made by an employee of the U.S. Government and may be manufactured and used by or for governmental purposes without the payment of any royalties thereon or therefor.

TECHNICAL FIELD

This invention pertains to cooling systems generally and, more particularly, to thermal regulating systems.

BACKGROUND ART

Thermal control systems have been devised to regulate the temperature of waste heat generating equipment. These systems typically dissipate heat from the equipment by mounting the equipment conductively against an external surface such as the exterior wall of a container, spacecraft or airplane and, thereby, allowing the external surface to radiate heat into the surrounding environment. Other designs for control systems allow the equipment to radiate waste heat into the interior of the vehicle and then use an external radiating surface such as the outer walls or discrete radiators mounted on the vehicle's exterior to cool the interior. In other systems thermal switches or heat pipes conduct waste heat from the interior of the vehicle to discrete, external radiators which discharge the waste heat directly into the surrounding environment. Heat transfer through the heat pipes and radiators has, in some systems, been made variable by means of variable conductance heat pipes, thermal switches or thermocouple actuators for positioning louvers to cover the radiating surfaces.

With the exception of those designs having the heat generating equipment mounted directly against an external radiating surface, previously available thermal control systems have had relatively low thermal efficiencies due to the intrinsically low transfer efficiencies of non-conductive intermediate links between the equipment and the radiating surfaces. These systems have performed satisfactorily despite their thermal inefficiencies because the heat generating equipment has usually been operated at temperatures above 30° C. over wide ranges of tolerance and the quantity of heat generated has been relatively small in comparison to the areas of the spacecraft available for use as external radiating surfaces. Their thermal inefficiencies, however, makes these systems unsuitable for reliably controlling the temperature of equipment operated below 30° C. Additionally, they are unsuitable for maintaining precise equipment temperature in the presence of such external causes of thermal variation as earth shine, albedo and diurnal ambience. Furthermore, these systems depend upon large radiating surface areas and usually require deployable radiator panels that render them unsuitable for compact spacecraft applications.

Several features of spacecraft, particularly their low-temperature, gravity-free environment and their accessibility to a constant, albeit limited, source of energy in the form of solar radiation have prompted proposals for using earth-orbiting spacecraft as plants for carrying manufacturing equipment and processes such as a continuous flow electrophoresis system for manufacturing blood plasma. These proposals include deployment of spacecraft containing process plants via a Shuttle-type cargo vehicle for multi-year operations with periodic, interim visits to the orbiting spacecraft to remove finished products and deliver additional raw materials. Economy of scale requires, however, that to achieve economic viability, such plants must be much larger than previously deployed experimental and communications spacecraft. Spacecraft containing exothermic industrial processes will, accordingly, require thermal control systems having a capacity approximately proportional to the cubic power of the waste heat removing capacity of current spacecraft systems because the quantity of waste heat generated is proportional to the volume of the plane. Such systems must be able to continuously radiate between several hundred to a few thousand watts of waste heat. The multi-layer lifetimes planned for these plants and the current lack of cooling system machinery such as pumps and compressors, able to provide continuous, maintenance-free operation over such lifetimes necessitates a passive system having no moving parts while conservation of the available power obtained from solar energy for more profitable use in the industrial process requires that the system consume little or no power. The size of the cargo bay capacity in Shuttle-type vehicles limits the overall size of industrial process spacecraft, thereby providing an incentive for maximizing the volume available to the industrial process by miniziming that required by auxiliary plant components such as the thermal control system. Ease of handling during deployment and interim vists, a need to provide a dynamically stable spacecraft to avoid interruption of an industrial process with sudden G-forces, and maintenance of an alignment between the spacecraft's solar panels and the sun, further requires that the thermal control system be relatively compact and have its mass symmetrically distributed so as to not significantly effect stability of the spacecraft. Moreover, the presence of solar panels means that the heat rejection system cannot use deployable radiator panels that might shade the solar panels and thereby interrupt the flow of solar energy to the process.

There has not been yet developed a controllable system without moving parts for removing variable quantities of heat from a continuously flowing, closed process loop. Such a system would be very useful in an airborne or an outer space environment where corrective maintenance is not available. The inefficiencies in the thermal conduction provided and the relatively large exterior radiating surfaces required by currently available thermal control system designs means that these designs are unsuitable for use with proposed air or spaceborne processes. Moreover, the construction of these thermal control systems as integral parts of a spacecraft renders them suitable for use in space as a compact, quickly detachable part of a spacecraft. Consequently, the large size, periodic maintenance requirements, difficulties of disassembly, and thermal conduction inefficiencies of state of the art thermal control systems means that both a process plant and its thermal control system must be retrieved from space together, a requirement which unnecessarily restricts the size of the plant and, thereby, limits its profitability.

STATEMENT OF INVENTION

Accordingly, it is one object of the present invention to provide an improved thermal control system.

It is another object to provide a thermal control system capable of maintaining low operating temperatures over very narrow tolerance ranges in the presence of variable temperature environments.

It is still another object to provide a thermal control system capable of continuously operating in a spacecraft environment over a multi-year lifetime.

It is a further object to provide a compact and dynamically stable thermal control system with a large waste heat rejection capacity.

It is a still further object to provide a thermal control system that avoids shading external components of a spacecraft.

These and other objects are achieved by a thermal control apparatus having a receptacle portion with spatially arranged, projecting thermal radiation members, a container portion with projecting members positionable in the space between the radiation members and having thermal material conductors, a plurality of heat pipes disposed in the spaced transversely to the conductors which transfer heat from the projecting members of the container to the projecting members of the receptacle, and thermally responsive devices which vary the heat transfer capability of the heat pipes inversely to the temperature of the material in the conductors.

BRIEF DESCRIPTION OF THE DRAWINGS

A more complete appreciation of this invention and many of the attendant advantages thereof will be readily apparent as the same becomes better understood by reference to the following detailed description when considered in conjunction with the accompanying drawings in which like numbers indicate the same or similar components, wherein:

FIG. 1 is an exploded perspective view of an embodiment of the invention with an industrial process module.

FIG. 2 is a perspective view of a variable conductance heat pipe.

FIG. 3 is a side cross-sectional view taken along line III—III in FIG. 2.

DETAILED DESCRIPTION OF THE INVENTION

Figure 4:
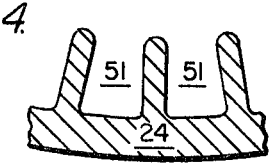
FIG. 4 is an enlarged partial cross-sectional view of a heat pipe segment.

Referring now to the drawings and, in particular, to FIG. 1, a thermal control system assembly 10 is shown in slidable disengagement from a module 12 containing heat generating equipment or an exothermic process. The system assembly 10 has a cylindrially-shapped radiator 13 formed by four elongate radiator panels 14 with curved exposed surfaces. Each of the radiator panels 14 are joined at one end to a circumferential rim 16 and are held in a spaced quadrature configuration. Arcuate spaces 18 exist between the radiator panels 14 which are occupied by banks of axially separated heat pipe evaporators 22. FIG. 2 shows a heat pipe 24 in which the evaporator 22 forms a blind, hollow end. As indicated in FIGS. 2 and 3, the evaporators 22 have flanges 26 which serve as saddles for attaching the evaporators to flat or slightly curved surfaces via bolt holes 27 formed in the flanges.

A pinched, intermediate section 30 couples the evaporation 22 to a condenser 31. Although not visible in FIG. 1, several condensers 31 are embedded between an inner and outer surface of radiator panel 14. A hollow bullbous end portion on condenser 31 opposite section 30 provides a reservoir 33. An electrical heating element 35, such as a filiment of nichrome wire, encircles reservoir 33. The alternate, quadrature arrangement of the radiator panels 14 and the banks of evaporators 22 protruding from the panels into spaces 18 forms a receptacle open at both ends to receive module 12.

The cargo module 12 has a generally cylindrical shape with a short drum 40 at its lower end. Four elongate heat exchanges 42 are spatially attached in a quadrature configuration to the sides of drum 40 and extend axially upward beyond the upper base 41 of drum 40. The heat exchangers preferably have substantially the same length as radiator panels 14. The broad outer surfaces 43 of the heat exchangers 42 form a quadrature arrangement around drum 40. Numerous holes 44 pierce the heat exchangers in even rows conforming to the pattern of holes 27 in heat pipe flange 26, thereby enabling the heat pipes to be easily attached by bolts to the broad outer surfaces 43 of the heat exchangers. The upper end of each heat exchanger is capped by a header 46 which is individually connected to drum 40 by a tube 48. The shape of the drum 40 and the quadrature configuration of the heat exchangers 42 provides module 12 with an exterior configuration conforming to the inside of assembly 10. The exterior diameter of cargo module 12 is, therefore, made smaller than the interior diameter of assembly 10 to allow the module 12 to be easily received and detachably fastened to the inside of the assembly, thereby forming a compact cannister.

Heat pipes 24 are discrete, closed tubes. Each pipe contains a measured amount of a working fluid. The section of each heat pipe attached to the heat exchanger 42 acts as an evaporator by vaporizing the working fluid with heat absorber from the heat exchanger. Conversely, the second embedded within a radiator panel 14 acts as a condenser by liberating heat from the working fluid. In normal operation, the working fluid receives heat over the length of the evaporator 22 from the heat exchanger 42, evaporates, and migrates in its gaseous phase into the condenser 31 where it transfers heat to an adjoining surface of the radiator panel 14 in which it is embedded. The working fluid then condenses into its liquid phase. The condensed fluid is then drawn back into the evaporator 22 by capillary action via a series of grooves 51, shown in a partial cross-sectional via by FIG. 4, which extend over the interior bore of the heat pipes. The quantity of heat that can be transferred by a heat pipe is directly proportional to the fraction of the overall length of the pipe occupied by the working fluid. The reservoir 33 contains a gas such as nitrogen which has a boiling point so low in comparison to the working fluid as to be considered a non-condensible gas.

Application of a small amount of heat to the reservoir by the heating element 35 causes the non-condensible gas to expand in volume towards the evaporator, thereby limiting the volume of the condensor available for precipitation of the condensing gas and effectively reducing the thermal length of the heat pipe. By controlling the amplitude of electrical current flow through each heating element 35 inversely in response to the temperature at the header 46 of the associated heat exchanger 42, each bank of heat pipes can be operated to precisely maintain a particular temperature at a corresponding width of a heat exchanger despite variations in ambient spacecraft temperature due to such causes as earthshine, albedo or varying diurnal heat radiated from a solar array.

Figure 5A:
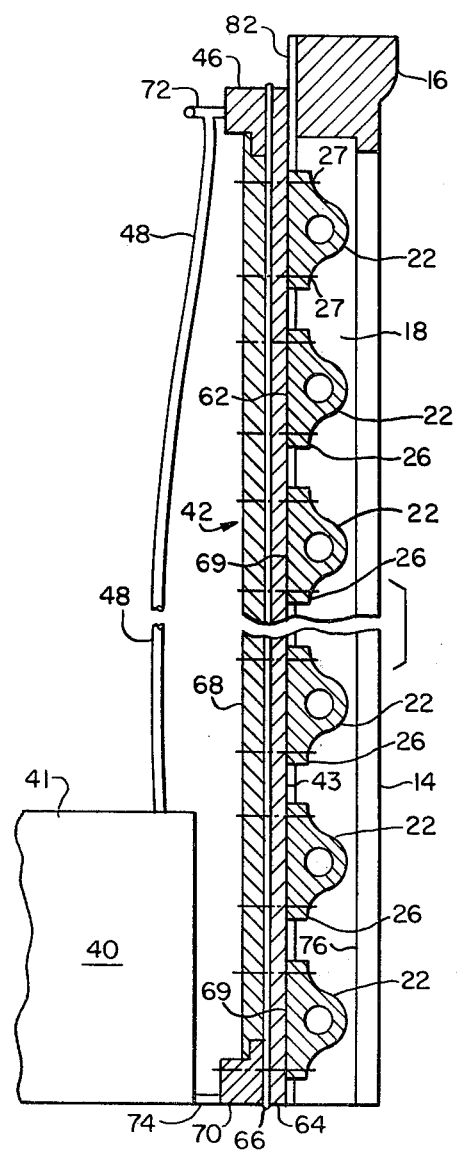
FIG. 5A is a cross-sectional view taken along line VA—VA in FIG. 1 of a bank of heat pipes attached to a heat exchanger.
Figure 5B:
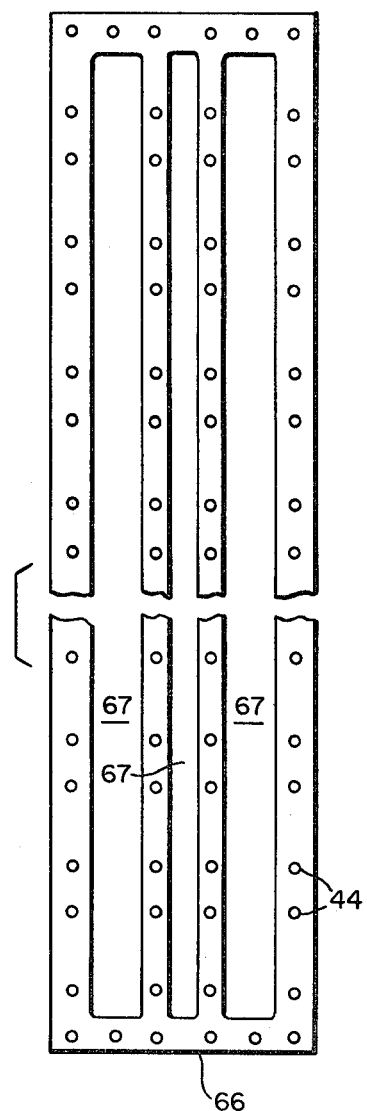
FIG. 5B is a front view of a heat exchanger gasket.

As shown in FIGS. 5A, when the thermal control system assembly 10 encloses a cargo module 12, each heat exchanger 42 will fit inside assembly 10 within an arcuate space 18. Each heat exchanger 42 is made with an outer flat metal plate 64 separated by a gasket 66 from an inner flat metal plate 68. The gasket 66, shown in FIG. 5B, has a plurality of cut-out sections over its length. As shown in FIG. 5A, the gasket extends from a lower header 70 at the base of heat exchanger 42 to the upper header 46. The cut-out sections provide parallel channels 67 for distributing a stream of material flowing between plates 64, 66. The gasket and plates are held together by bolts (not shown) some of which may also be used for coupling the flanges to the heat exchanger. Gasket 66 is made of metal with its surface adjoining inner plate 68 covered with a thin layer of Kapton glued in placed by a thicker layer of epoxy to form a low thermal conductivity barrier between the inner and outer plates, thereby causing the outer plate 64 to serve as the main area of heat transfer. Layers of a thermally conductive grease 69 applied to the interfaces of evaporators 22 and heat exchanger plates 64 enhances thermal conduction. Headers 46 and 70 each have a port, 72, 74 respectively. Port 72 provides a connection between header 46 and return tube 48 for cannister 40 while port 74 couples drum 40 directly to header 70. In a typical application, a stream of material circulates between drum 40 and heat exchangers 42, passing through ports 72, 74 and tubes 48. In effect, each heat exchanger serves to distribute the flow of material passing between ports 72, 74 over their wide internal channels 67, thereby exposing the material to the broad surface area of the adjoining plates 64. This action facilitates the transfer of heat by thermal conduction between the stream of material and the bank of evaporators 22.

Figure 5C:
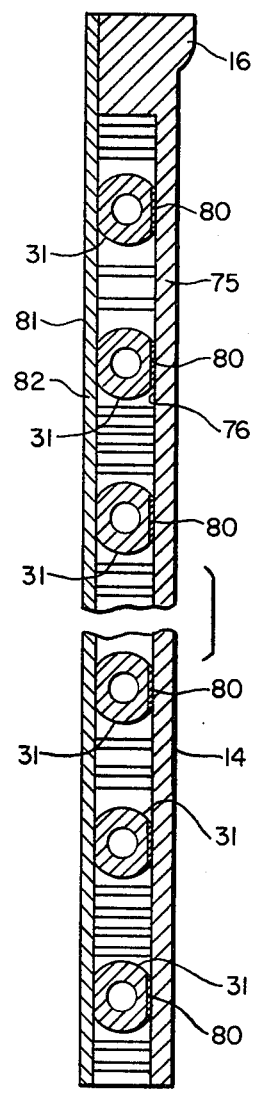
FIG. 5C is a cross-sectional view taken along line VC—VC in FIG. 1 of a bank of heat pipes attached to a radiator panel.

As illustrated in FIG. 5C the radiator panels 14 are integrated units, each having an outer metal plate 75 preformed to conform to the arcuate profile of the condensers 31 of the heat pipes. Condensers 31 are thermally bonded to the inner surface 76 of the outer plate 75 of panel 14 by an adhesive such as silver-filled chromerics cement 80. The inner surface 81 of the radiator panel is formed by a cylindrical plate 82 fitted against the other surfaces of the heat pipes to close the radiator panel and to reflect heat from the inner heat pipe surfaces away from the open receptacle formed by the assembly 10. A metal honeycomb member 84 is fitted between plates 75 and 82 to provide a stiffened connection. Each radiator panel 14 is, therefore, a discrete, arcuate section of a cylindrical, thermal control system assembly and has a plurality of axially spaced condensers 31 of heat pipes 24 embedded with the honeycomb member 84 between plates 75, 82. In effect, the two plates 75, 82 form cylindrical walls of a receptacle open at both ends. The evaporators 22, intermediate sections 30, and the flanges 26 of the heat pipes protrude beyond the axial sides of each panel 14, thereby providing open access to the flanges and facilitating their quick connection to a heat exchanger.

Figure 6:
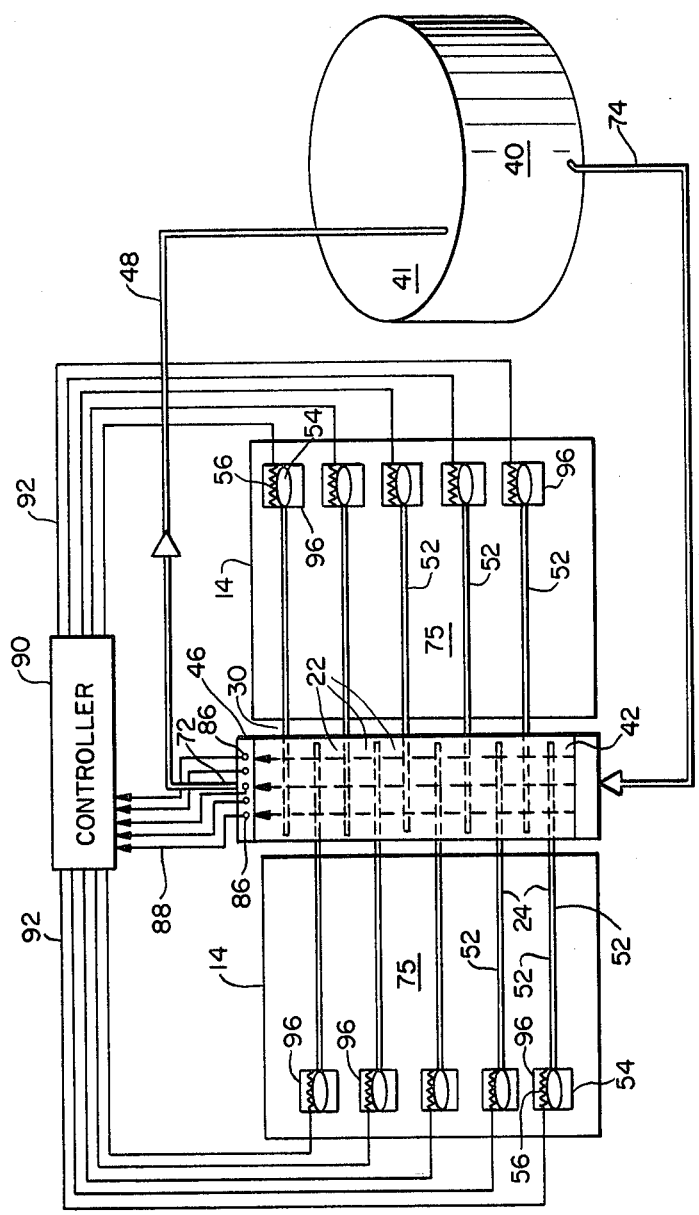
FIG. 6 is a diagrammatic representation of a partial section of a heat rejection system connected to a process module.

The volumetric isolation between the industrial process drum 40 and the thermal control assembly 10 is illustrated by the flow diagram of FIG. 6. To simplify the illustration, only one heat exchanger 42, the adjacent two radiator panels 14, and the associated heat pipes are shown in conjunction with a single process fluid loop of drum 40. Material from drum 40 flows via port 74 to heat exchanger header 46 where the process fluid is divided to travel axially through the channels along the length of the heat exchanger adjacent to the inside of plate 64. The process fluid flowing with the channels is collected by header 46 and returned via port 72 and tube 48 to process drum 40. This system preserves the isolation between the process fluid of the exothermic process and the working and control fluids of the thermal control systems, thereby assuring that the process can remain sealed and uncontaminated by either the thermal control system or the extra-terrestrial environment of the spacecraft.

The processes that are currently proposed for outer space deployment characteristically operate in the temperature range between 0° and 10° C. and require a continuous process material such as a fluid flowing between heat exchanger ports 72 and 74. Typically, the process material must be returned to the drum 40 at a specific, invariable temperature, thus necessitating a continuous transfer of heat, principally by thermal conduction, between heat exchanger 42 and the associated bank of heat pipe evaporator sections 22. The temperature of process material leaving drum 40 via port 74, however, may in some processes vary as a function of time. Additionally, the amount of heat radiated per unit area of panels 14 may vary due to ambient conditions. To assure a constant temperature of process material at port 72, one or more temperature sensors 86, such as thermistors, are mounted near a discharge end of the heat exchanger; e.g., in header 46. The temperature sensors are selected to provide a signal proportional in amplitude to the temperature of the process material passing through header 46 to one lead 88 of an electronic controller 90. The controller 90 may consist of a plurality of parallel circuit stages coupled across a voltage source. Each stage is connected to a heater element 56 of heat pipes. Each stage has a temperature sensor 86 serially coupled to an input port of an amplifier. The output port of the amplifier is serially coupled via lead 92 to one of the reservoir heaters 56. The temperature sensors 86 are chosen to exhibit a single electrical characteristic such as a variable resistance, that changes with process matrial temperature. Consequently, each amplifier produces a decrease in current flows through heater element 56 in response to an increase in the process material temperature at header 46. Variation of the temperature of process material passing through header 46 causes a change in the electrical characteristics of one or more of the sensors 86, thereby effecting the amplitude of voltage at the input port of the associated amplifier A and, concomitantly, the voltage at the output port of the amplifier and the current flow through the corresponding heater element 56. The heater element then changes the temperature of the corresponding control fluid in the respective one of the reservoirs 54. The effective thermal length of a heat pipe available for transferring heat by thermal conduction from the condensing section 52 to the radiator panel 14 varies inversely with the temperature of the control fluid within its reservoir 54. The amplitude of electric current supplied to a reservoir heater 56 by controller 90 must, therefore, vary inversely to the process material temperature indicated by sensor 86. A low process fluid temperature indication means that excessive heat is being transferred between the heat exchanger and the radiator panels via the heat pipes, and thus necessitates either commencement or an increase in the amplitude of current to one or more reservoir heaters, thereby causing a reduction in the effective thermal length of the corresponding heat pipes and in the quantity of heat transferred from the heat exchanger to the radiator panels via the affected heat pipes. As sensors 86 indicate a responsive rise in process fluid temperature, the amplitude of electrical current to the affected reservoir heaters is reduced until the process fluid temperature either stabilizes or drops.

To maximize the area of the open bore provided by the cylindrically-shaped radiator 13, the control fluid reservoirs 56 are preferably positioned between the plates 75, 82 of the radiator panel. To prevent the instantaneous temperature of the radiator panel from controlling the temperature of the control fluid, opening 96 are cut into outer plates 75 large enough to surround and expose the entire outer surfaces of the reservoirs 54. Openings 96 may be used to permit the reservoirs 54 to radiate heat directly into the heat sink provided by space to quickly reduce the control fluid temperatures and thereby quickly increase the effective thermal lengths of the heat pipes. Leads 88 and 92 may be arranged into quick-disconnect electrical harnesses (not shown) to facilitate the connection between control assembly 10 and process module 12.

Figure 7:
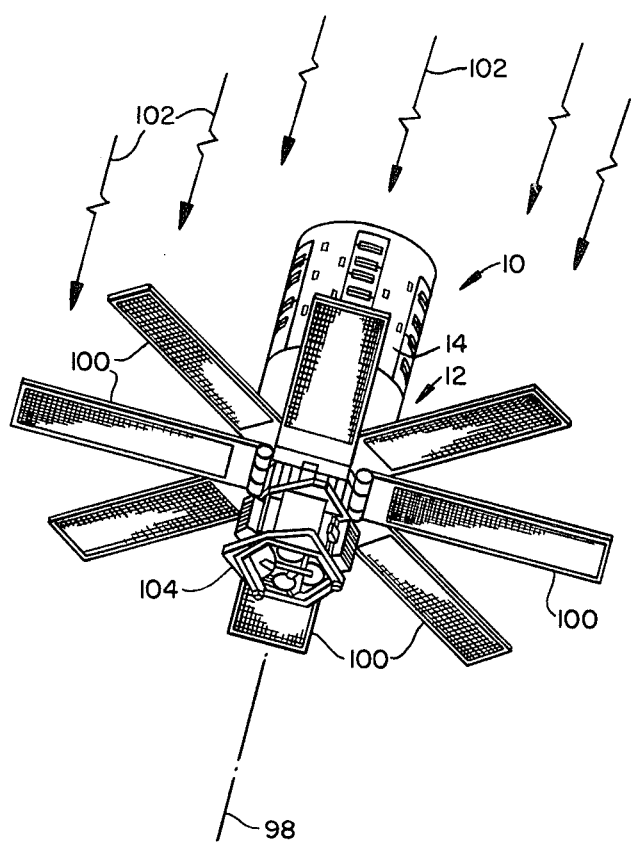
FIG. 7 is a perspective view of the invention in a spacecraft.

The system disclosed can provide continuously reliable thermal control at operating temperatures for spaceborne process plants. The circular, cylindrical configuration provides a compact assembly in the shape of a receptacle with central opening into which such plants may be inserted and removed while deployed in space. As shown in FIG. 7, a process module 12 containing raw materials may be initially deployed in space with an attached thermal control system assembly 10 as a single cylindrical cannister having its longitudinal axis 38 pointing toward the sun. A plurality of solar photovoltaic panels 100 attached to the base of process module 12 opposite to the thermal control assembly 10 may be then extended radially outward from the process module 12 to receive radiant solar energy 102 to provide a continuous source of electrical energy to the process module. It may be noted that the compact cylindrical arrangement of the thermal control system assembly avoids significant shading of the solar panels, thus assuring a continuous, uninterrupted flow of solar rays to the panels 100. A microwave antenna 104 may be attached to the base of process module 12 between the solar panels 100 to provide communication with earth stations. After operation in space for a period of months, the solar panels may be retracted and a Shuttle type vehicle can closely approach the spacecraft, disconnect and remove the process module 12 from the thermal control system 10, attach a replacement module 12 to system 10, and return the spacecraft to its orbit. The removed module 12 will then be returned to earth where finished products are removed and new raw materials inserted while the process plane machinery is overhauled. The resupplied module may then be returned to space. The ease of disassembly of the thermal control system from the process module eliminates the necessity for transporting the entire spacecraft back to earth whenever the process module needs to be resupplied. This feature facilitates redeployment of the module because the cost and weight of repeatedly transporting the thermal control assembly is avoided.

The system disclosed may be modified to facilitate its adaption to particular requirements of different processes. Module 12, for example, may be made in two sections with only one of the sections thermally coupled to the heat exchanger. The other section will serve as a container for new materials aand finished products and will be insertable into the opening of the thermal control assembly on rails. The other section may be connected directly to the first section via a single quick-disconnect feature, thereby simplifying replenishment of a spacecraft. It should be noted that although the several figures show the condensing sections of each bank of heat pipes embedded within alternative radiator panels, the thermal control system may be constructed with all of the heat pipes in a bank embedded within one radiator panel. Such an arrangement will provide radiator panels coupled via a single bank of heat pipes to a single heat exchanger, thereby facilitating replacement of a single damaged radiator panel during a replenishment mission in outer space.

We claim:
1. A thermal control system, comprising:
  means (13) having a plurality of exposed surfaces (14) forming an open receptacle wherein adjacent ones of said exposed surfaces are spaced apart by intermediate separations (18) for radiating heat from said exposed surface;
  means (42) having channels (67) adjoining corresponding thermally conductive members (64) insertable within said intermediate separations (18) in spaced separation from said exposed surfaces (14) for distributing a stream of a material whose temperature is to be controlled;
  means (24) contiguous to said exposed surfaces and connectable to said thermally conductive members for transmitting thermal energy between said thermally conductive members and said exposed surfaces; and
  means (54, 56, 86, 90) responsive to the temperature of said material for regulating the effectiveness of said transmitting means inversely to the temperature of said material within said distributing means.

2. The thermal control system of claim 1 wherein said radiating means and said transmitting means form sides of said open receptacle.

3. The thermal control system of claim 2 wherein said transmitting means comprises:
  a plurality of first sections (31) contiguous to said radiating means; and
  a plurality of second sections (22) individually joined to said first sections and connectable to said thermally conductive members, extending into said intermediate separations to form sides of said receptacle adjoining said radiating means.

4. The thermal control system of claim 3 wherein said first sections of said transmitting means are connectable in a thermally conductive relation to said thermally conductive members transversely to the direction of flow of said stream of process material within said channels.

5. The thermal control system of claim 4 wherein said channels run within said intermediate separations axilly with said sides of said receptacle.

6. A thermal control system, comprising:

a receptacle (13) having an open end and a plurality of panels of a thermally conductive material arrayed with exposed surfaces spaced arcuately apart by a plurality of intervening gaps (18) to form the exterior of said receptacle;

a plurality of closed, variable conductance heat pipes (24) having condensers (52) joined in a thermally conductive relation to said panels in proximity to said exposed surfaces, evaporators (22) thermally connected to said condensers and protruding beyond said exposed surfaces into said intervening gaps (18), and reservoirs (54) containing a gaseous phase fluid adjoining said condensers;

a plurality of heat exchangers (42) having members (64) insertable into said intervening gaps in spaced separation from said panels and connectable in a thermally conductive relation to said evaporators, and channels (67) extending through the interiors of said heat exchangers adjacent to said conductive members and transversely to a plurality of said evaporators;

a temperature sensor (86) responsive to the temperature of material flowing through said channels; and means (56, 90) controlled by said temperature sensor for heating said gaseous phase fluid in response to a decrease in the temperature of said flowing material.

* * * * *